2,890,242

AMINE MODIFIED ACETALS

Bernard H. Kress, Lafayette Hill, Pa., assignor to Quaker Chemical Products Corporation, Conshohocken, Pa., a corporation of Pennsylvania No Drawing. Application September 14, 1955
Serial No. 534,411

8 Claims. (Cl. 260—501)

This invention relates to amine modified acetals and methods of preparing same. More specifically, it relates to condensation products formed by reacting amino-alcohol salts, including quaternary ammonium compounds, with polyols and aldehydes. In particular, it relates to amine modified polyacetals.

It is well known that acetal formation will take place by reaction of an alcohol and an aldehyde under acidic conditions. On the other hand, if an amino-alcohol, such as ethanolamine or diethanolamine, either with or without a polyalkylene glycol, is heated with an aldehyde such as formaldehyde a dark condensation product is formed which is probably a so-called Schiff base. I have now found, however, that by neutralizing the amine with a sufficiently strong acid, such as hydrochloric, phosphoric, tartaric, p. toluene sulfonic and the like, the amino-alcohol salt will condense with an aldehyde, such as formaldehyde, or will cocondense with polyols and formaldehyde to form useful acetals. Similarly, if tertiary amino-alcohols, such as triethanolamine, methyl diethanolamine, and the like, are quaternized to form quaternary ammonium alcohol salts, these compounds will react with formaldehyde under acidic conditions to yield acetals which possess unique properties. The preferred embodiment of my invention lies in the use of such quaternary ammonium alcohol salts.

The following examples will serve to illustrate the invention:

Example 1

An aqueous solution of monoethanolamine was mixed with sufficient tartaric acid to obtain a pH of at least 6 to form monoethanolamine tartrate. The following mixture consisting of:

40 parts of ethanolamine tartrate (100% basis, prepared as above)
95 parts of diethylene glycol
30 parts of paraformaldehyde
0.1 part p. toluene sulfonic acid
40 parts toluene were refluxed using a water trap to remove water. After 20 parts of water of reaction had been removed the toluene was evaporated to yield a red-brown water soluble product.

Example 2

Diethanolamine was neutralized with a solution of hydroxyacetic acid to yield a neutral solution.

95 parts diethylene glycol
10.5 parts diethanolamine (neutralized as above)
33 parts paraformaldehyde (91%)
0.1 part p. toluene sulfonic acid
50 parts toluene were refluxed using a Dean & Stark trap. After 20 parts of water of reaction had been removed toluene was evaporated in vacuo. A brownish liquid remained which was soluble in water.

Example 3

The tartrate salt of triethanolamine was prepared in the same manner as in Example 1.

0.9 mole diethylene glycol
0.1 mole triethanolamine tartrate
1.0 mole paraformaldehyde
0.1 gm. p. toluene sulfonic acid
40 ml. toluene were refluxed using a Dean & Stark trap. After 20 ml. of water of reaction had been collected toluene was evaporated in vacuo. The product was a yellow viscous liquid soluble in water.

Example 4

Methyl diethanolamine was quaternized by first preparing the following solution:

1 mol methyl diethanolamine
75 g. water

Into this solution there was dropped with agitation 1 mole methyl p. toluene sulfonate. After all of the ester had been added the solution was heated to ensure completion of reaction. Analysis indicated at least 98% quaternization.

100 parts of the prepared quaternary ammonium compound (75% solids)
16.5 parts of paraformaldehyde (91%)
0.1 part p. toluene sulfonic acid
40 parts toluene were refluxed using a Dean & Stark trap. After the water of reaction was removed toluene was evaporated in vacuo to obtain a straw-colored somewhat viscous liquid soluble in water.

Other quaternary ammonium compounds may be used to produce the quaternary ammonium-modified polyformals. Thus, triethanolamine was treated with a molar equivalent of benzyl chloride to obtain benzyl triethanolammonium chloride. The quaternary was used as follows to prepare a modified polyformal.

Example 5

| | Parts |
|---|---|
| Benzyl triethanolammonium chloride | 69 |
| Diethylene glycol | 106 |
| Paraformaldehyde (91%) | 41 |
| p. Toluene sulfonic acid | 0.2 |
| Toluene | 40 |

The mixture was refluxed using a Dean & Stark trap until 22.5 parts of water of reaction were removed. Toluene was then stripped off in vacuo. A somewhat viscous water dispersible cationic yellow liquid was obtained.

Example 6

The above reaction was repeated except that half of the diethylene glycol was replaced by 67 parts of dipropylene glycol. A yellow water dispersible liquid was obtained when subjected to the same treatment as the aforementioned example.

Other alkylene glycols may be used, for example:

Example 7

| | Parts |
|---|---|
| Methyl triethanolammonium p. toluene sulfonate | 50 |
| Polyethylene glycol (mol. wt. 300) | 100 |
| Paraformaldehyde (91%) | 16.5 |
| p. Toluene sulfonic acid | 0.1 |
| Toluene | 30 | were refluxed using a moisture trap. After 9 parts of water of reaction were removed and toluene evaporated a light yellow water dispersible liquid was obtained.

Example 8

Polyols, such as glycerine, pentaerythritol, mannitol, sorbitol, etc., may also be used to modify these products. Thus, Example 1 was repeated with the addition of 36 parts of pentaerythritol and after processing in the same manner a somewhat more viscous liquid was obtained which was self-dispersing in water.

These compounds have various uses. Some of them are described in the following examples.

Example 9

7% product of Example 2
3% zinc chloride-diglycolic acid (1:4)

Rayon challis was padded through the above solution twice and nipped twice through rolls with the pressure adjusted to obtain 100% wet pick-up. The fabric was then placed on a pin frame, dried at 180° F. and cured for 5 minutes at 315° F. The fabric was washed thoroughly with soap and water, dried and then dyed with Cibalan Red. The treated piece showed a greater depth of shade than an untreated piece of rayon indicating greater affinity for the acid dyestuff.

A sample of the treated fabric was tested for shrinkage according to the American Association of Textile Chemists and Colorists Method 14–52 with the following result:

| Fabric: | Percent warp shrinkage |
|---|---|
| Treated | 0.0 |
| Untreated | 4.7 |

Similar dye results were obtained with Du Pont Anthraquinone Blue SWF and Kiton Pure Blue V, both being acid dyestuffs.

Example 10

The products prepared in Examples 3 and 4 were applied to fabric and cured as described in Example 9. When dyed with the three dyes described in the previous example, greater depth of dyeing was obtained with the treated fabrics. The following shrinkage results were obtained:

| Fabric treatment: | Warp shrinkage |
|---|---|
| Product Example 3 | 0.0 |
| Product Example 4 | 0.0 |
| None | 7.0 |

Example 11

Triethanolamine was quaternized with methyl p. toluene sulfonate and converted to a complex formal with diethylene glycol and paraformaldehyde in a manner similar to that described in Example 5.

Filter paper was converted to pulp in a blender and then treated as follows: 1% pulp suspensions were mixed with the formals listed in the following table and stirred for several minutes and then filtered. The mats were dried at 180° F. and cured for 5 minutes at 315° F. The mats were then calendered and cut into ¼" strips for wet tensile strength tests. The following results were obtained:

| Treatment (percent of pulp) | Catalyst (percent of pulp) | Wet Tensile (gms.) |
|---|---|---|
| Example 11 preparation (0.10) | 0.10 potassium alum | 422 |
| Unmodified polyformal of diethylene glycol and paraformaldehyde (0.125) | 0.125 potassium alum | 205 |
| None | 0.10 potassium alum | 140 |
| None | None | 68 |

It is thus evident that a considerably greater wet strength effect is caused by the substantivity of the formal containing the quaternary ammonium group.

These illustrative examples are not intended to limit the scope of the present invention. Thus various primary, secondary and tertiary amines are included within the scope of this invention. Substituted alcohol-amines, monoalkanol amines, such as isopropanol amine, amino methyl trihydroxy methane and its mono- and di-esters and ethers, and the like, are included within the scope of this invention. Secondary, tertiary and quaternary hydroxy amines containing higher aliphatic radicals may also be employed such, for example, as di(hydroxyethyl)dodecyl amine. Similarly, quaternary compounds obtained by reaction of tertiary amines with alkyl halides and aryl halides, such as methyl iodide, benzyl chloride and the like, and quaternaries obtained from phosphoric, sulfuric and sulfonic acid esters can be used. Quaternaries from dihalides may also be employed.

The amino-alcohol salts obtained may be co-reacted with any suitable alkylene glycol or polyalkylene glycol and with any mono- or di-aldehyde containing not more than eight carbon atoms in the monomeric form, in order to yield acetals. Furthermore, the amount of substitution by these amine compounds can be greatly varied. Usable compounds are obtained wherein the only alcoholic reactant is a quaternary ammonium hydroxylic compound, as in Example 4. On the other hand, only minor amounts of such products may be co-reacted with formaldehyde and a glycol.

In many of the preceding examples, I have used diethylene glycol as a co-reactant with the hydroxylic amine salt or quaternary ammonium compound, together with paraformaldehyde. Useful condensation products, however, may also be made using in place of diethylene glycol such compounds as trimethylene glycol, 1,4-butylene glycol, dipropylene glycol, dibutylene glycols and higher dialkylene glycols, polyalkylene glycols, mixtures thereof, or their mixtures with diethylene glycol which are reactive with formaldehyde or other aldehydes to form water-soluble products or products which are dispersible in water, either alone or with the aid of appropriate adjuvants. Polyalkylene glycols, such as triethylene glycol, tetraethylene glycol, tripropylene glycol and the like, may also be used, either alone or in admixture with the aforementioned dialkylene glycols. Likewise, polyols, such as glycerine, pentaerythritol and sorbitol, may be added to the alkylene glycols for reaction with the aldehyde in forming water-soluble or water-dispersible products. Instead of the paraformaldehyde of the above examples, trioxane, methylal, aqueous formalin and similar formaldehyde-generating compounds may be used. Instead of formaldehyde, other reactive aldehydes, such as acetaldehyde, propanal, butanal, benzaldehyde, glyoxal, terephthaldehyde and other dialdehydes, containing not more than 8 carbon atoms in the monomeric form, and mixtures thereof, may be used in forming water-soluble or water-dispersible condensation products. The term "alkylene" is understood to include a doubly unsatisfied aliphatic radical containing a substituted or unsubstituted straight chain possessing from two to four carbon atoms in the chain and having its unsatisfied valences on either adjacent or separated carbon atoms.

If desired, the polymeric chains of the compounds of my invention may be terminated, either in whole or in part, by means of an alkyl radical possessing not more than 8 carbon atoms. The alkyl radical may be introduced in any suitable manner. I may, for example, co-react an aldehyde and a glycol in the presence of a minor amount of a half ether of a glycol to serve as a chain stopper.

I prefer to react substantially equimolar ratios of the aldehyde to the total of the hydroxyl bearing compounds in making my condensation products, but I may also use an excess of any reactant. The condensation products of this invention may be either monomeric or polymeric in nature. By polymeric, I mean that my condensation products contain two or more aldehyde units and two or more polyhydric alcohol units per molecule of condensation product. These polyhydric alcohol units may be contributed either by a polyhydroxy ammonium salt or by a polyol co-reactant, or both.

The products of my invention are useful as substantive dimensional control agents for cellulosic fabrics, non-swelling wood and paper, and also as wet strength reactants in paper treatment. Furthermore, they are useful in textiles in the "animalization" of cellulosics in order to enhance dye affinity and act in a similar manner on polyamide polyacrylonitrile and cellulose acetate fibers and textiles.

These products are also of use in metal treatment in that the polar group may cause surface adsorption of the molecules on metals and hence prevent corrosion or permit drawing and the like. They are also useful as compounds of grinding compounds. They may be used in leather technology, both as tanning adjuvants and as softeners. They may be used as viscose spinning assistants and for the prevention of rot and mildew. They are useful rubber compounding ingredients and may be used as lubricants to assist in cutting and grinding of glass.

I claim:

1. A polymeric acetal condensation product comprising the reaction product made under acidic conditions and at reflux temperatures of a salt of an amino alcohol containing at least two hydroxy groups and an aldehyde, said salt being selected from the group consisting of amine salts and quaternary ammonium salts of strong acids and said aldehyde containing not more than eight carbon atoms in monomeric form, said condensation product having at least two aldehyde units and at least two polyhydric alcohol units per molecule.

2. A polymeric acetal condensation product comprising the reaction product made under acidic conditions and at reflux temperatures of a salt of an amino alcohol, a polyalkylene glycol, an aldehyde and a polyol, said salt being selected from the group consisting of amine salts and quaternary ammonium salts of strong acids and said aldehyde containing not more than eight carbon atoms in monomeric form, said condensation product having at least two aldehyde units and at least two polyhydric alcohol units per molecule.

3. A polymeric acetal condensation product made under acidic conditions and at reflux temperatures of a salt of an amino alcohol, an alkylene glycol and an aldehyde, said salt being selected from the group consisting of amine salts and quaternary ammonium salts of strong acids and said aldehyde containing not more than eight carbon atoms in monomeric form, said condensation product having at least two aldehyde units and at least two polyhydric alcohol units per molecule.

4. A polymeric acetal condensation product made under acidic conditions and at reflux temperatures of a salt of an amino alcohol, a dialkylene glycol and an aldehyde, said salt being selected from the group consisting of amine salts and quaternary ammonium salts of strong acids and said aldehyde containing not more than eight carbon atoms in monomeric form, said condensation product having at least two aldehyde units and at least two polyhydric alcohol units per molecule.

5. A polymeric acetal condensation product made under acidic conditions and at reflux temperatures of a salt of an amino alcohol, a polyalkylene glycol and an aldehyde, said salt being selected from the group consisting of amine salts and quaternary ammonium salts of strong acids and said aldehyde containing not more than eight carbon atoms in monomeric form, said condensation product having at least two aldehyde units and at least two polyhydric alcohol units per molecule.

6. A polymeric acetal condensation product made under acidic conditions and at reflux temperatures of a salt of an amino alcohol, diethylene glycol and formaldehyde, said salt being selected from the group consisting of amine salts and quaternary ammonium salts of strong acids, said condensation product having at least two aldehyde units and at least two polyhydric alcohol units per molecule.

7. A polymeric acetal condensation product made under acidic conditions and at reflux temperatures of an amino alcohol salt, a glycol, a polyol and an aldehyde, said amino alcohol being selected from the group consisting of monoethanolamine, diethanolamine, and triethanolamine, and said salt being selected from the group consisting of amine salts and quaternary ammonium salts of strong acids, said condensation product having at least two aldehyde units and at least two polyhydric alcohol units per molecule.

8. A polymeric acetal condensation product made under acidic conditions and at reflux temperatures of an ethanolamine salt, diethylene glycol, and formaldehyde, said ethanolamine being selected from the group consisting of monoethanolamine, diethanolamine, and triethanolamine, and said salt being selected from the group consisting of amine salts and quaternary ammonium salts of strong acids, said condensation product having at least two aldehyde units and at least two polyhydric alcohol units per molecule.

References Cited in the file of this patent

UNITED STATES PATENTS

| | | |
|---|---|---|
| 2,175,183 | Dreyfus et al. | Oct. 10, 1939 |
| 2,391,942 | Burke | Jan. 1, 1946 |